(12) United States Patent
Wicker et al.

(10) Patent No.: US 11,374,959 B2
(45) Date of Patent: Jun. 28, 2022

(54) IDENTIFYING AND CIRCUMVENTING SECURITY SCANNERS

(71) Applicant: International Business Machines Corporation, Armonk, NY (US)

(72) Inventors: Jason M. Wicker, Pittsboro, NC (US); Travis Cornwell, Durham, NC (US); Matthew Munse, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 16/199,873

(22) Filed: Nov. 26, 2018

(65) Prior Publication Data
US 2020/0169580 A1    May 28, 2020

(51) Int. Cl.
*H04L 9/40*    (2022.01)

(52) U.S. Cl.
CPC ...... *H04L 63/1433* (2013.01); *H04L 63/1491* (2013.01)

(58) Field of Classification Search
CPC .......................... H04L 63/1433; H04L 63/1491
See application file for complete search history.

(56) References Cited

U.S. PATENT DOCUMENTS

| | | | | |
|---|---|---|---|---|
| 7,774,839 | B2 * | 8/2010 | Nazzal | H04L 63/14 726/22 |
| 8,266,703 | B1 * | 9/2012 | Magdych | H04L 63/1433 726/25 |
| 8,601,586 | B1 * | 12/2013 | Boutros | H04L 63/1433 726/25 |
| 9,306,969 | B2 | 4/2016 | Dagon et al. | |
| 9,462,013 | B1 * | 10/2016 | Boss | H04L 63/1416 |
| 9,495,188 | B1 * | 11/2016 | Ettema | H04L 63/20 |
| 9,516,058 | B2 | 12/2016 | Antonakakis et al. | |
| 9,781,099 | B1 | 10/2017 | Brinskelle | |
| 10,044,675 | B1 * | 8/2018 | Ettema | H04L 63/1491 |
| 2013/0191920 | A1 * | 7/2013 | Amit | H04L 63/166 726/25 |

(Continued)

OTHER PUBLICATIONS

Anonymous, Cross site Scripting (XSS) attacks, copyright 2017, WEB application security center; IMPERVA INCAPSULA, 4 pages.

(Continued)

*Primary Examiner* — Jason Chiang
(74) *Attorney, Agent, or Firm* — Schmeiser, Olsen & Watts, LLP; Michael O'Keefe

(57) ABSTRACT

A system and method for identifying and circumventing a security scanner includes monitoring incoming traffic to a web application, identifying a portion of the incoming traffic as security scanner traffic by comparing the incoming traffic to a security scanner traffic profile, and circumventing the security scanner by providing dummy content or signaling the web application to provide dummy content. The security scanner traffic profile is created by receiving web application traffic generated by a plurality of security scanners; identifying web application traffic features common to at least a portion of the plurality of security scanners by modelling using artificial intelligence, machine learning, and the like; and generating the security scanner traffic profile based on the identified web application traffic features.

12 Claims, 14 Drawing Sheets

(56) References Cited

U.S. PATENT DOCUMENTS

| | | | | |
|---|---|---|---|---|
| 2013/0333032 | A1* | 12/2013 | Delatorre | H04L 63/1441 726/23 |
| 2015/0096035 | A1* | 4/2015 | Adams | H04L 63/1441 726/25 |
| 2015/0135265 | A1* | 5/2015 | Bagrin | H04L 63/029 726/1 |
| 2016/0261715 | A1* | 9/2016 | Luria | H04L 63/10 |
| 2017/0237771 | A1* | 8/2017 | Miroshnikov | H04L 63/1408 726/23 |
| 2017/0270304 | A1* | 9/2017 | Li | H04L 63/1416 |
| 2018/0075233 | A1* | 3/2018 | Gray | H04L 63/145 |
| 2019/0222587 | A1* | 7/2019 | Kamir | H04L 63/1491 |
| 2019/0306178 | A1* | 10/2019 | Weizman | H04L 63/1416 |
| 2019/0327258 | A1* | 10/2019 | Choi | H04L 41/22 |

OTHER PUBLICATIONS

Seyyar et al., "Detection of attack-targeted scans from the Apache HTTP Server access logs," Applied Computing and Informatics (2017), 9 pages.

Goseva-Popstojanova et al., "Classification of malicious web sessions," in: 2012 21st International Conference on Computercommunications and Networks (ICCCN), 2012, 978-1-4673-1544-9/12, pp. 1-9.

Bernardo, "Clear and present danger: interventive and retaliatory approaches to cyber threats" $_a$ 2014 The Author. Production and hosting by Elsevier B.V. on behalf of King Saud University, http://dx.doi.org/10.1016/j.aci.2014.11.002 2210-8327 $^a$ 2014 The Author. Production and hosting by Elsevier B.V. on behalf of King Saud University. This is an open access article under the CC BY-NC-ND license (http://creativecommons.org/licenses/by-nc-nd/3.0/). 14 pages.

Ya et al., "Mining Host Behavior Patterns from Massive Network and Security Logs, "International Conference on Computational Science, ICCS 2017, Jun. 12-14, 2017, Zurich, Switzerland, 10 pages.

Krawetz, "Anti-honeypot technology." IEEE Security & Privacy 2.1 (2004): 76-79.

Mell, Peter et al.; "The NIST Definition of Cloud Computing;" National Institute of Standards and Technology; Special Publication 800-145; Sep. 2011; 7 pages.

Merve Base Seyyar et al., Detection of attack-targeted scans from the Apache HTTP Server accesslog, Applied Computing and Informatics, vol. 14, Issue 1, Jan. 2018, pp. 28-36, Available online Apr. 28, 2017, https://www.sciencedirect.com/science/article/pii/S2210832717300169, 9 pages.

Mike Murphy, What IBM's Watson thinks of your favorite authors' personalities, Published Jul. 25, 2015, https://qz.com/463666/what-ibms-watson-thinks-of-your-favorite-authors-personalities/, 7 pages.

* cited by examiner

US 11,374,959 B2

IDENTIFYING AND CIRCUMVENTING SECURITY SCANNERS

TECHNICAL FIELD

The present invention relates to systems and methods for identifying and circumventing security scanners, and more specifically the embodiments of a system for identifying and circumventing security scanners by monitoring incoming traffic to a web application, comparing the monitored incoming traffic to a security scanner traffic profile generated by modelling security scan traffic to identify security scanners, and circumventing security scanners by providing dummy content.

BACKGROUND

Security scanners are used for identifying vulnerabilities in web applications. In addition to being useful for web application developers, architects, and administrators, security scanners may be used by nefarious parties to identify potential security vulnerabilities that can then be exploited.

SUMMARY

An embodiment of the present invention relates to a method, and associated computer system and computer program product, for identifying and circumventing security scanners. A processor of a computing system monitors incoming traffic to a web application and compares the incoming traffic to a security scanner traffic profile to identify a portion of the incoming traffic as security scanner traffic originating from the security scanner. The processor provides dummy content to the security scanner and/or signals the web application to provide dummy content to the security scanner in order to circumvent the security scanner.

A further embodiment of the present invention relates to a method, and associated computer system and computer program product, for identifying and circumventing security scanners in which the processor also receives web application traffic generated by a plurality of security scanners; identifies web application traffic features common to at least a portion of the plurality of security scanners; and generates the security scanner traffic profile based on the identified web application traffic features common to the portion of the plurality of security scanners.

DETAILED DESCRIPTION

Web applications often have limited or no defense against security scanners used by nefarious parties. Instead, legitimate security scans conducted by web application developers, architects, and administrators must be relied on to catch vulnerabilities and the vulnerabilities must be corrected during the test phase. Following the test phase, web applications are susceptible to security scanners that may identify new or undetected vulnerabilities. Embodiments of the present invention may identify or detect such security scanners and may provide a means for circumventing them instead of serving their requests. Embodiments of the invention may identify security scanners by monitoring web application traffic and identifying security scanner traffic by comparing the monitored traffic to a security scanner traffic profile. The security scanner traffic profile may be generated by modelling web application traffic known to be associated with security scanners, for example, by artificial intelligence and/or machine learning. Embodiments of the invention may circumvent the identified or detected security scanners by serving static and/or sanitized content or serving honeypot content, instead of properly responding to the security scanners requests. Static sanitized content may trick the security scanner into believing that its attempt was unsuccessful, that the web application is impervious to attacks, and/or that the web application does not contain vulnerabilities. Further, honeypot content may allow security specialists more time to identify the source of the attack while protecting the web application.

Figure 1:
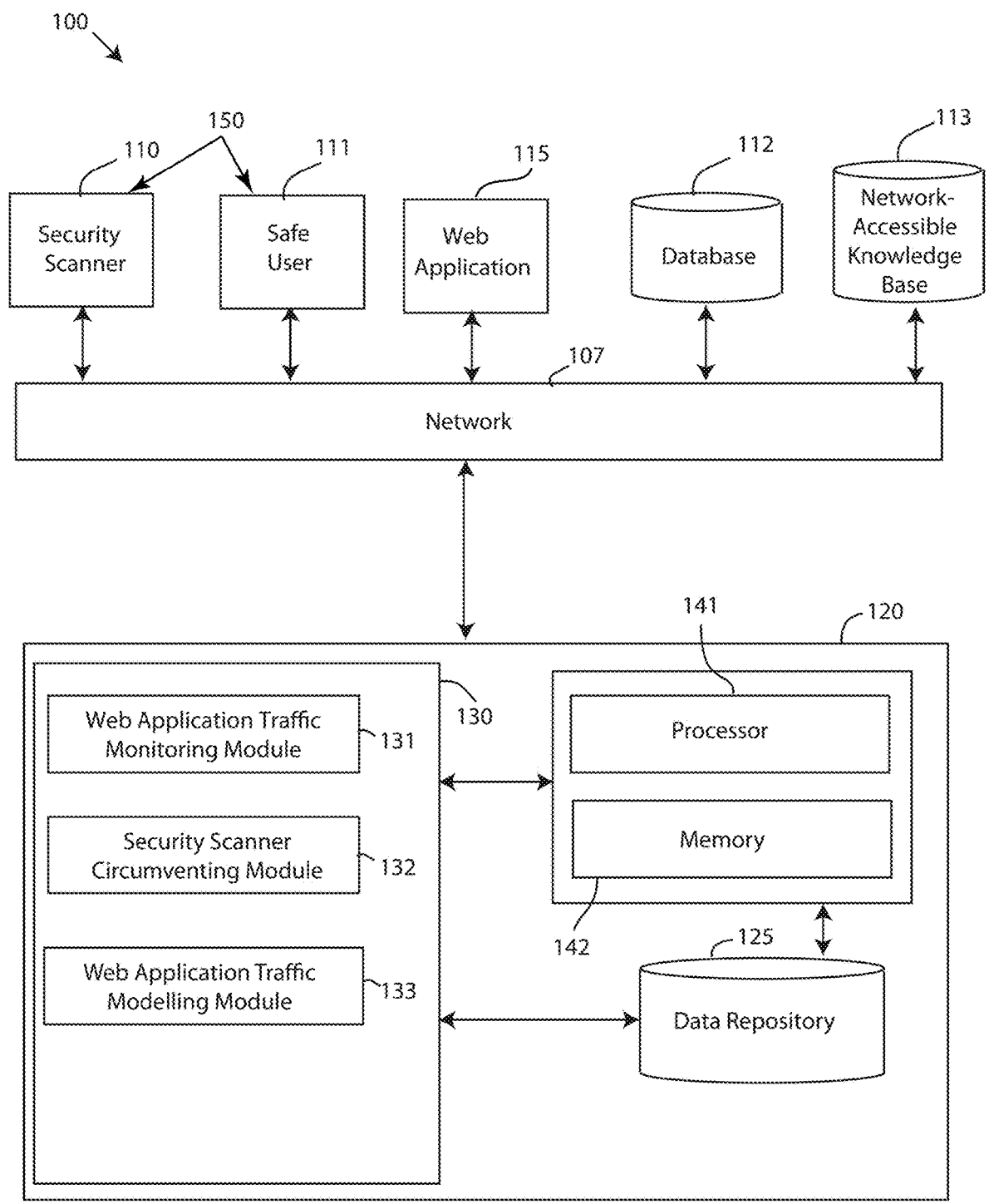
FIG. 1 depicts a block diagram of a security scanner identification and circumvention system, in accordance with embodiments of the present invention.

Referring now to the drawings, FIG. 1 depicts a block diagram of a security scanner identification and circumvention system 100, in accordance with embodiments of the present invention. Embodiments of the security scanner identification and circumvention system 100 may be a system for identifying/detecting and circumventing a security scanner. The security scanner identification and circumvention system 100 may detect or identify the security scanner by monitoring incoming traffic and comparing the incoming traffic to a security scanner traffic profile. After detection/identification, the security scanner identification and circumvention system 100 may circumvent the security scanner by providing the security scanner with dummy content. Providing dummy content may trick the security scanner into thinking that its attempts were unsuccessful, that no attack is possible, that there are no vulnerabilities, and/or may allow security specialists more time to identify the source of the attack.

In some embodiments, the security scanner identification and circumvention system 100, may also generate the security scanner traffic profile by modelling known security scanner traffic and identifying features associated with security scanners.

Embodiments of the security scanner identification and circumvention system 100 may be useful for improving post-development or post-release security of web applications and may improve an efficiency of web application security. Further, embodiments of the security scanner identification and circumvention system 100 may improve security by identifying security scanners and responding such that the security scanners cannot determine or are not alerted that the scanner was identified or detected. Further, embodiments of the security scanner identification and circumvention system 100 may more quickly identify and respond to the security scanner, for example, in real time or substantially real time, rather than waiting for access log analysis, application updates, or other detection methods.

Further, embodiments of the security scanner identification and circumvention system 100 may be useful for improving the legitimate operations of security scanners and similar programs or devices. For example, security scanners are often vendor-provided tools with legitimate uses for identifying vulnerabilities during web application design, development, and testing. By allowing the security scanner identification and circumvention system 100 to model web application traffic from their security scanners or similar tools and include that information in the security scanner traffic profile, vendors may effectively "de-weaponize" their security scanners and similar tools. For example, having the vendor's security scanners and similar tools modelled and included in the security scan traffic profile limits the vendor's security scanner's and similar tool's usefulness as a weapon or means of attack that may be used by nefarious or malicious parties. Thus, in addition to improving security of the web application, the security scanner identification and circumvention system 100 may also improve the trust and reputation of the vendor and the vendor's security scanners and similar tools.

Referring again to FIG. 1, embodiments of the security scanner identification and circumvention system 100 may include a processor that uses artificial intelligence, machine learning, and the like. Embodiments of the security scanner identification and circumvention system 100 may include a computing system 120. Embodiments of the computing system 120 may be a computer system, a computer, a server, one or more servers, a backend computing system, and the like.

Furthermore, embodiments of security scanner identification and circumvention system 100 may include users 150 that are communicatively coupled to a web application 115 over a network 107. The users 150 may be, for example, a security scanner 110 and a safe user 111. The users 150 and the web application 115 may also be communicatively coupled to the computing system 120 over the network 107. The security scanner identification and circumvention system 100 may also include a database 112. For instance, information/data may be transmitted to and/or received from the security scanner 110, the web application 115, and the database 112 over the network 107. The network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 113 such as network repository, which are network repositories containing information, network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 113 may be referred to as servers.

The network-accessible knowledge bases 113 may be a data collection area on the network 107 which may back up and save all the data transmitted back and forth between the nodes of the network 107. For example, the network repository may be a data center saving and cataloging information sent between/among the users 150, the web application 115, the computing system 120, etc., as well as any combinations thereof. Further, in some embodiments, the network-accessible knowledge bases 113 may store the security scanner traffic profile, portions thereof, or information associated therewith. In some embodiments, a data collection center housing the network-accessible knowledge bases 113 may include an analytic module capable of analyzing each piece of data being stored by the network-accessible knowledge bases 113. Further, the computing system 120 may be integrated with or as a part of the data collection center housing the network-accessible knowledge bases 113. In some alternative embodiments, the network-accessible knowledge bases 113 may be a local repository that is connected to the computing system 120.

Moreover, embodiments of the security scanner identification and circumvention system 100 may include a database 112. Embodiments of the database 112 may be a database or other storage device maintained or otherwise controlled by the computing system 120, the web application 115, or the users 150. In some embodiments, the database 112 may store the security scanner traffic profile, portions thereof, or information associated therewith.

Embodiments of the security scanner 110 may be a computer program or a device containing a computer program for communicating with a web application such as web application 115. The security scanner 110 may communicate with the web application 115 in order to identify potential security vulnerabilities in the web application 115. The security scanner 101 may also identify architectural weaknesses. In some embodiments, the security scanner may perform a black-box test and/or may detect vulnerabilities by performing an attack or probe. By way of example, an attack may be a cross site scripting attack (XSS) or an SQL injection attack (SQLI). Other types of attacks may also be used by the security scanner 110, such as path disclosure, denial of service, code execution, memory corruption, cross site request forgery, information disclosure, arbitrary file, local file inclusion, remote file inclusion, buffer overflow, code injections, and the like.

The security scanner 110 may be used by the web application 115's developer, architect, administrator, and the like, to detect vulnerabilities in the web application 115 during the test phase, prior to release, and at other time periods. In such settings, the scanner 110 may simulate an attack or probe by a nefarious or malicious party, allowing the web application 115's developer, architect, administrator, etc. to identify and correct vulnerabilities. The security scanner 110 may also be used by the nefarious party to perform an actual attack or probe against the web application 115. Embodiments of the present invention may detect or identify the security scanner 110 and circumvent the attack or probe.

Embodiments of the web application 115 may be a client-server computer program or a device containing a client-server computer program. In some embodiments, the client may run the web application 115 in a web browser. Examples of web applications may include webmail, online retail sales, online auctions, web-based file sharing services, web-based photo editing services, web-based media streaming services, wikis, instant messaging services, cloud computing services, banking and finance services, healthcare services, etc.

In some embodiments, the web application 115 may be accessed over a network such as the network 107, for example, the web application 115 may be accessed over network 107. Access over the network 107 may use standard procedures such as HTTP or others. In some embodiments, designated parties or users may access or be able to access the web application 115 or the web application may be generally accessible. In some embodiments, the security scanner 110 may be able to access the web application 115. For example, the security scanner 110 may be able to access the web application 115 through the network 107 using HTTP.

Furthermore, embodiments of the computing system 120 of the security scanner identification and circumvention system 100 may be equipped with a memory device 142 which may store various data/information/code, and a processor 141 for implementing the tasks associated with the security scanner identification and circumvention system 100.

In some embodiments, an identification and circumvention application 130 may be loaded in the memory device 142 of the computing system 120. Embodiments of the identification and circumvention application 130 may be an interface, an application, a program, a module, or a combination of modules. In an exemplary embodiment, the identification and circumvention application 130 may be a software application running on one or more back end servers, servicing one or more web applications 115. In some embodiments, such as the embodiment shown in FIG. 5A and described in more detail below, the identification and circumvention application 130 may be part of a firewall; in other embodiments, such as the embodiment shown in FIG. 5B and described in more detail below, the identification and circumvention application 130 may be a part of the web application 115 itself, instead of a part of the computing system 120.

The identification and circumvention application 130 may include a web application traffic monitoring module 131 and a security scanner circumventing module 132. In some embodiments, the identification and circumvention application 130 of the computing system 120 may also include a web application traffic modelling module 133. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the web application traffic monitoring module 131 may include one or more components of hardware and/or software program code for monitoring incoming traffic to the web application 115. In some embodiments, the web application traffic monitoring module 131 may monitor the incoming traffic in real time or may monitor access logs. In some embodiments, monitoring may be conducted continuously or at specific intervals. Monitoring, for example, may mean the computing system 120 in general, or the web application traffic monitoring module 131 in particular, receives, has access to, "listens" to, analyzes, evaluates or otherwise examines incoming traffic to the web application 115. Incoming traffic may comprise requests sent to the web application 115, for example, HTTP requests or requests using other standard protocols.

The web application traffic monitoring module 131 may monitor the incoming traffic in order to detect or identify the traffic as security scanner traffic. Security scanner traffic may be traffic that originates from a security scanner such as security scanner 110. Incoming traffic may be identified as security scanner traffic by comparing the monitored incoming traffic to a security scanner traffic profile. The security scanner traffic profile may be a profile that includes features commonly used by security scanners, features that are uncommon to normal/safe users or programs, and other information useful for identifying incoming traffic as security scanner traffic. The features included in the security scanner traffic profile may be features related to application requests, for example HTTP requests, or requests using other standard protocols. For example, the features may be a component of the request or may be structure or syntax of the request. The feature may be in the request-line, the header, or the message-body. For example, security scanners such as security scanner 110 may often submit end-quotes, end-parentheses, and end-tags which would not commonly be part of user input. Similarly, security scanners such as security scanner 110 may submit as user input some variation of <script> in user input to probe for cross-site scripting vulnerabilities. As another example, security scanners such as security scanner 110 may include input structured as SQL or LDAP requests to probe for injection vulnerabilities. The web application traffic monitoring module 131 may recognize such features in the incoming traffic based on a comparison with the security scanner traffic profile. In some embodiments, the application requests may be used in the security scanner traffic profile in contrast to other methods of preventing attack that rely on Domain Name System (DNS) information and patterns or network behavior patterns such as port scanning.

In some embodiments, the security scanner traffic profile may be created and/or updated by artificial intelligence, machine learning, and the like as is described in more detail below, specifically with respect to the web application traffic modelling module 133. The security scanner traffic profile may be stored in the identification and circumvention application 130, for example in the web application traffic monitoring module 131. Alternatively, the security scanner traffic profile may be stored in a distinct location in the computing system 120, such as the memory 142, or a data repository 125. Still further, the security scanner traffic profile may be stored in a location accessible by the computing device over a network such as network 107, for example, in database 112 or in network-accessible knowledge base 113. In some embodiments, the security scanner traffic profile may be stored in the web application 115. The computing system 120, processor 141, identification and circumvention application 130, or web application traffic monitoring module 131 may access the security scanner traffic profile from these locations or may store a temporary or permanent copy as needed.

In the event incoming traffic is identified as security scanner traffic by the web application traffic monitoring module 131, the web application traffic monitoring module 131 may signal or otherwise notify the security scanner circumventing module 132.

Referring still to FIG. 1, embodiments of the security scanner circumventing module 132 may include one or more components of hardware and/or software program code for acting in response to the signal or other notification that a security scanner such as security scanner 110 has been detected or security scanner traffic has been identified. For example, the security scanner circumventing module 132 may act to circumvent, evade, deceive, or trick the security scanner 110 or otherwise defeat or mitigate the attack or probe by the security scanner 110. These actions may be generally referred to as circumventing the security scanner 110.

In some embodiments, circumventing may be accomplished by providing dummy content to the security scanner 110. Dummy content may be static content and/or sanitized content. Alternatively, the dummy content may be honeypot content.

In some embodiments, the static content and/or sanitized content may be served to security scanner 110, for example, as a response to HTTP requests coming from the security scanner 110. The static content and/or sanitized content may also be provided to the security scanner 110 by redirecting security scanner traffic from the security scanner 110 to a static site. The static site may be a different site than the web application 115 or may be a specific part of the web application 115 used for this purpose. Providing static content and/or sanitized content may trick the security scanner 110 into believing that an attack or probe would be unsuccessful. Further, this tactic may be used to return cookies having Secure and/or HttpOnly attributes in order to prevent the scanner from further attacking or probing these avenues.

In some embodiments, the serving of static content and/or sanitized content may cause the security scanner 110 to mistakenly believe the web application 115 is impervious to the attack or probe.

Similarly, honeypot content may be served to the security scanner 110, for example, as a response to HTTP requests coming from the security scanner 110. The honeypot content may also be provided to the security scanner 110 by redirecting security scanner traffic from the security scanner 110 to a honeypot site. The honeypot site may be a different site than the web application 115 or may be a specific part of the web application 115 used for this purpose. As a further example, a HTTP 200 response may be served to the security scanner 110 indicating that the request from the security scanner 110 has been received and is being processed. In some embodiments, the HTTP 200 response may be used instead of a HTTP 302 response indicating a redirection because some security scanners may be capable of identifying a HTTP 302 response as common honeypot content. Serving honeypot content may allow security specialists additional time to identify the source of the attack or probe, while still protecting the web application 115.

In some embodiments, circumventing the security scanner 110 may include serving the request from the security scanner 110 as described instead of blocking the request as other defenses do. This is beneficial in that the security scanner 110 may thus believe the web application is impervious to attack or does not have any vulnerabilities. Conversely, blocking the attack may result in the security scanner 110 taking measures to overcome the blocking defense and/or attempting a different type of attack or probe. For example, blocking the attack may signal to the security scanner 110 (and the malicious or nefarious attacker using the security scanner 110) that they had been identified. Instead, serving static, sanitized content may signal that the attack failed or the web application 115 is impervious to attack, making it likely that the attacker moves on to an easier target rather than continuing the attack.

In some embodiments, the identification and circumvention application 130 of the computing system 120 may also include a web application traffic modelling module 133. The web application traffic modelling module 133 may model web application traffic to generate the security scanner traffic profile. For example, in some embodiments, the web application traffic modelling module 133 may be provided with traffic known to be generated by a plurality of security scanners such as security scanner 110. The web application traffic modelling module 133 may analyze the traffic known to be from security scanners, including specific requests such as HTTP requests, and model the security scanner traffic to build a security scanner traffic profile. As described above, the security scanner traffic profile may be based on features that are not commonly used by normal/safe users and may be based on features that are commonly used by security scanners such as security scanner 110. The security scanner traffic profile may include traffic features that are determined to be common or shared between traffic generated by two or more security scanners such as security scanner 110.

In some embodiments, the modelling may be performed during the development or test phase of a web application such as web application 115. Thus, the web application traffic modelling module 133 may monitor security scanner traffic from security scanners such as security scanner 110 while the security scanners are used by legitimate parties to test or evaluate the web application. In some embodiments, the modelling may be performed after the release of the web application, for example, while the web application is "live" or "active" and is serving requests from users 150. It will be understood that any combination of these time frames may be used, for example, security scanner traffic may be modelled during development and testing of the web application and further traffic may be monitored and modelled after release or while the web application is "live" or "active".

In some embodiments, the security scanner traffic profile may be created, updated, and/or revised by artificial intelligence, machine learning, and the like. For example, because the identification and circumvention application 130 and the web application traffic monitoring module 131 may continuously or periodically monitor incoming web traffic and identify/detect security scanner traffic, the web application traffic monitoring module 131 may also continuously or periodically model the data to update/revise the security scanner traffic profile, especially when security scanner traffic is identified or detected. For example, when a security scanner such as security scanner 110 is identified or detected by the identification or detection of security scanner traffic, the web application traffic modelling module 133 may include information from the newly detected/identified security scanner traffic and model the information along with previously received information to determine if additional common features of security scanners may be added to the profile or similar updates to the security scanner traffic profile may be made. Likewise, traffic information from normal/safe traffic may be used to further refine the security scanner traffic profile and reduce or remove any false positives, etc.

It will be understood that the web application traffic modelling module 133 may be included in the identification and circumvention application 130 as described above or may be included as a separate or distinct component of the computing system 120. Further, the web application traffic modelling module 133 may be included in a second computing system in some embodiments. The second computing system may be connected to the computing system 120, for example by a direct connection or through a network such as the network 107. Thus, the security scanner traffic profile may be accessible to the computing system 120 from the second computing device. Alternatively, the security scanner traffic profile may be transferrable from the second computing system to the computing system 120, for example, by means of a portable memory or storage device.

Figure 2:
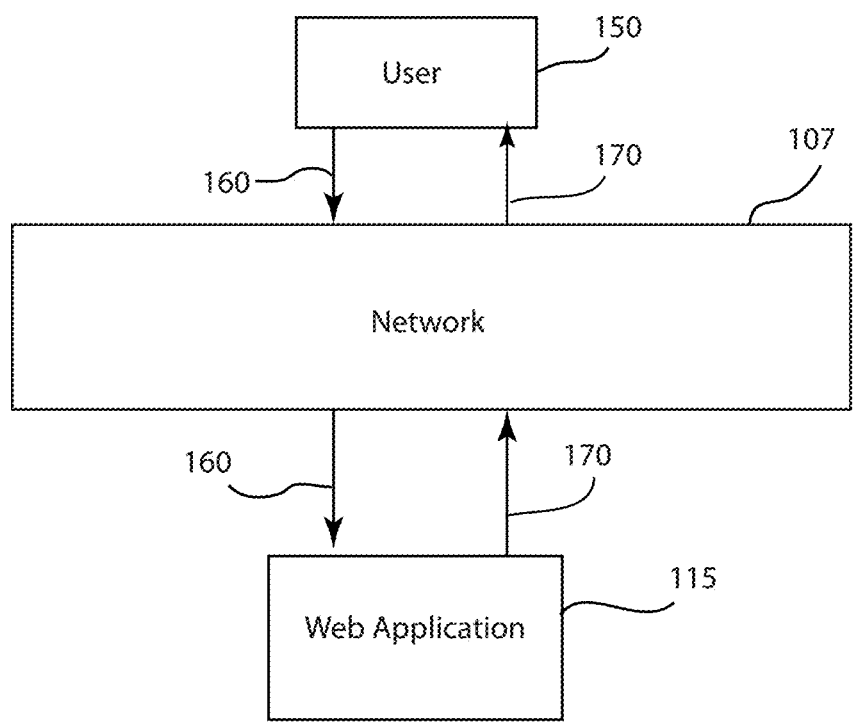
FIG. 2 depicts a block diagram of an information exchange between a user and a web application over a network, in accordance with embodiments of the present invention.

FIG. 2 depicts a block diagram of an information exchange between a user and a web application over a network, in accordance with embodiments of the present invention. For example, FIG. 2 shows web application traffic between a user 150 and the web application 115 over the network 107. The user 150 may submit a user request 160, for example an HTTP request or the like, to the web application 115 through the network 107. The user request 160 may be provided to the web application 107 through the network and the web application 115 may service or respond to the user request 160 by providing a response 170. Response 170 may be, for example, information requested in the user request 160, an indication that the user request 160 has been received and is being processed, a denial, a request for more information, a request for credentials, and the like. In some embodiments, the response 170 may be an HTTP response or the like. The response 170 may be provided to the user 150 through the network 107.

Figure 3:
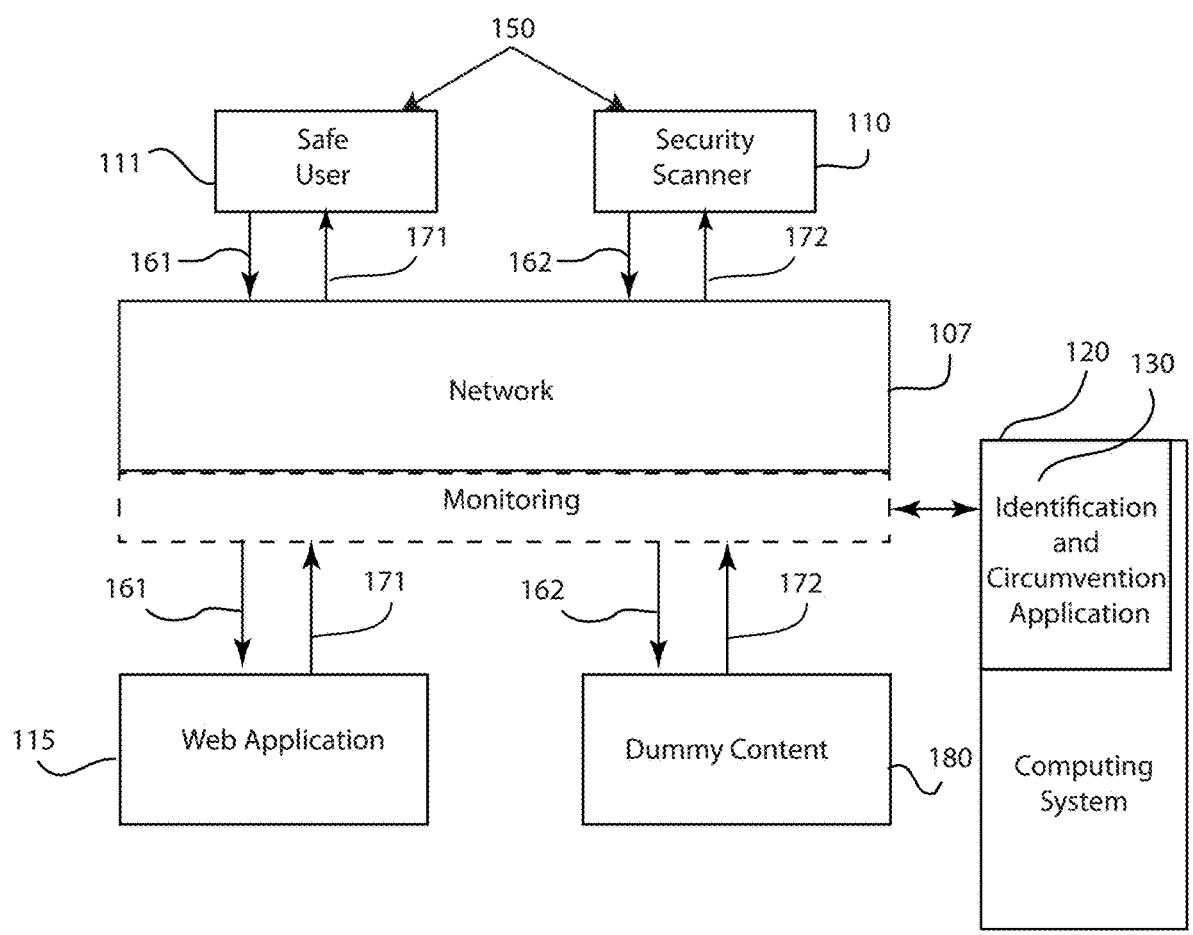
FIG. 3 depicts a block diagram of a security scanner identification and circumvention system used in connection with an information exchange between multiple users and a web application over a network, in accordance with embodiments of the present invention.

FIG. 3 depicts a block diagram of a security scanner identification and circumvention system used in connection with an information exchange between multiple users and a web application over a network, in accordance with embodiments of the present invention. For example, FIG. 3 shows web application traffic between users 150 and the web application 115 over the network 107. Unlike FIG. 2, two users 150 are shown, a safe user 111 and a security scanner 110. Further, activity of the web traffic monitoring module 131 is depicted. The computing system 120 monitors the web application traffic as has been discussed, for example, by the web application traffic monitoring module 131 of the identification and circumvention application 130. For example, the computing system 120 monitors the user requests, in this case, both a safe user request 161 and a security scanner request 162. The computing system 120, or more specifically, the web application traffic monitoring module 131, may also identify web application traffic that originates from security scanner 110 as security scanner traffic, for example, the computing system 120 may identify security scanner request 162 as security scanner traffic. Identification may be accomplished by use of the security scanner traffic profile as has been discussed. For example, as part of monitoring the web application traffic, including the safe user request 161 and the security scanner request 162, the computing system 120 and/or the web application traffic monitoring module 131 may compare the web application traffic to the security scanner traffic profile. The web application traffic monitoring module 131 may determine that comparison of security scanner request 162 with the security scanner traffic profile reveals similarities between the security scanner request 162 and the security scanner traffic profile. For example, the security scanner request 162 may share request features with the security scanner traffic profile or may include features that the security scanner profile indicates are commonly used by known security scanners or are unlikely to be used by known safe users.

Upon identifying security scanner request 162, the computing system 120, or more specifically, the identification and circumvention application 130, or even more specifically, the security scanner circumventing module 132, may then act to circumvent the security scanner 110. For example, the security scanner circumventing module 132, or the identification and circumvention application 130, or the computing system 120, may redirect the security scanner request 162 so that it is directed to dummy content 180 instead of to the web application 115. Accordingly, instead of providing response 170, dummy response 172 may be provided to the security scanner 110, for example, through the network 107. Dummy response 172 may be any response that does not provide the information requested by the security scanner request 162, for example static content, sanitized content, or honeypot content as discussed above.

Figure 4:
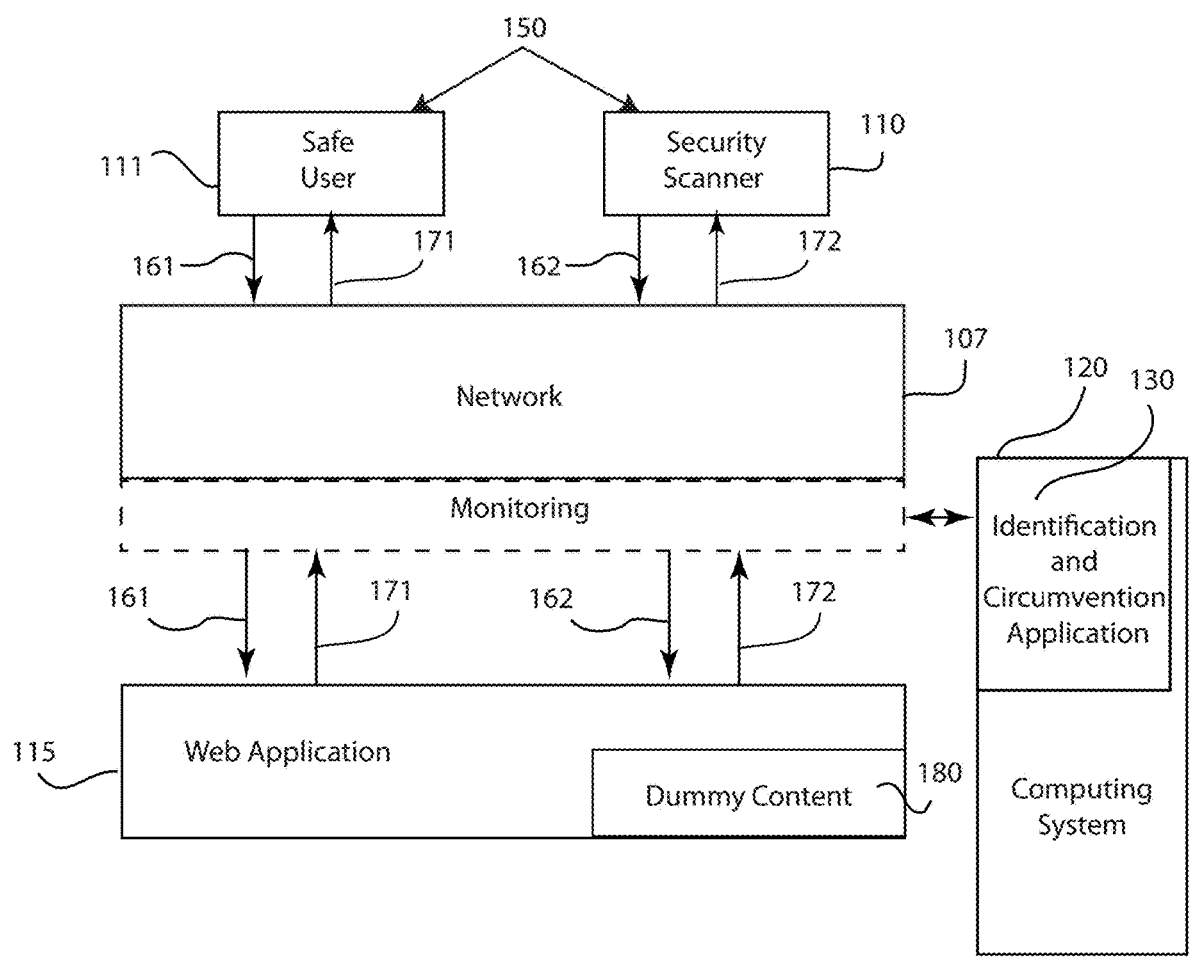
FIG. 4 depicts a block diagram of a security scanner identification and circumvention system used in connection with an information exchange between multiple users and a web application over a network, in accordance with further embodiments of the present invention.

FIG. 4 depicts a block diagram of a security scanner identification and circumvention system used in connection with an information exchange between multiple users and a web application over a network, in accordance with further embodiments of the present invention. In some embodiments, for example the embodiment depicted in FIG. 4, instead of redirecting the security scanner request 162, the computing system 120 or the security scanner circumventing module 132 may instruct the web application 115 itself to provide dummy content 180 by way of dummy response 172.

Referring still to both FIG. 3 and FIG. 4, web application traffic that is not identified as security scanner traffic may be provided a normal response 171, which would be identical or substantially similar to response 170, i.e., a response that includes information requested in the user request 161, an indication that the user request 161 has been received and is being processed, and the like.

In some embodiments, rather than being a part of computing system 120, the identification and circumvention application 130, and/or the web application traffic monitoring module 131 and security scanner circumventing module 132 may be configured such that they are part of a common web application firewall or may be situated in the network 107 in the same or similar manner to typical firewalls.

Figure 5A:
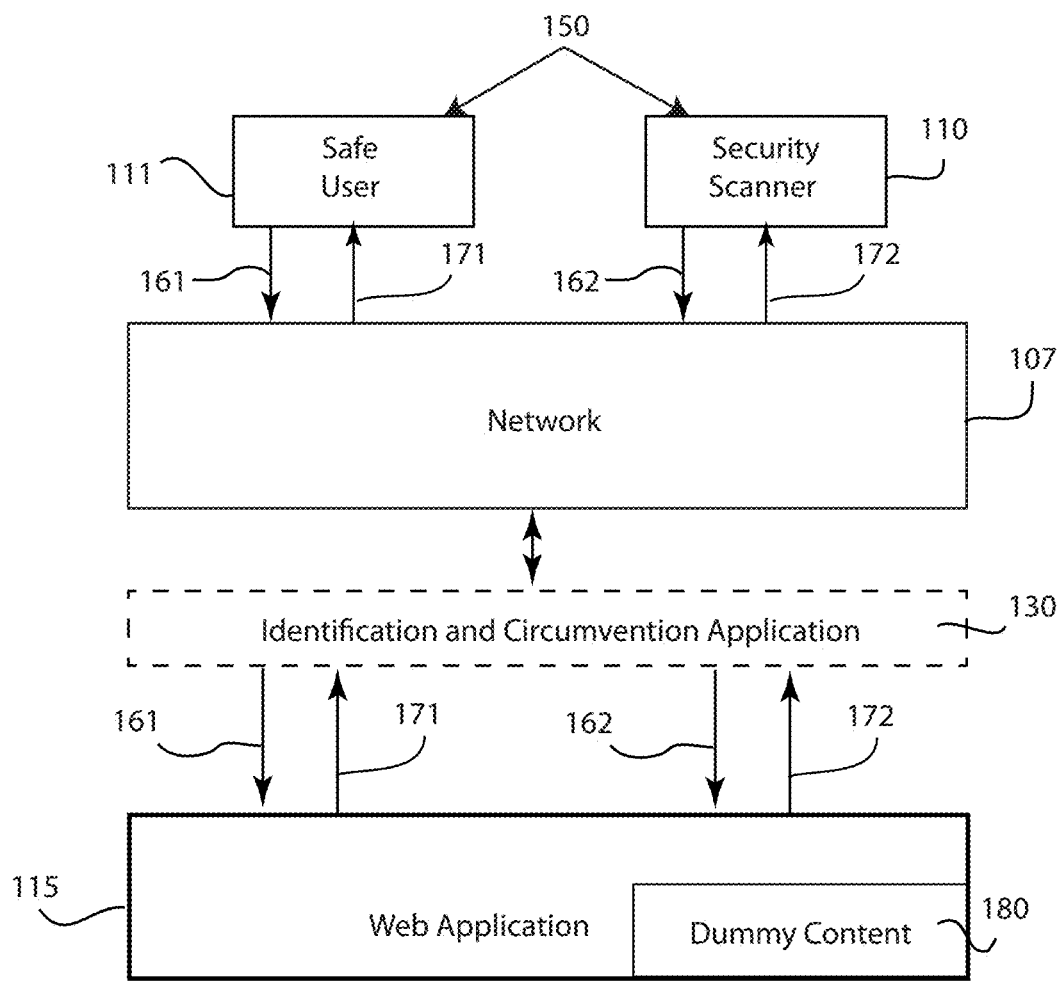
FIG. 5A depicts a block diagram of a security scanner identification and circumvention system used in connection with an information exchange between multiple users and a web application over a network, in accordance with further embodiments of the present invention.
Figure 5B:
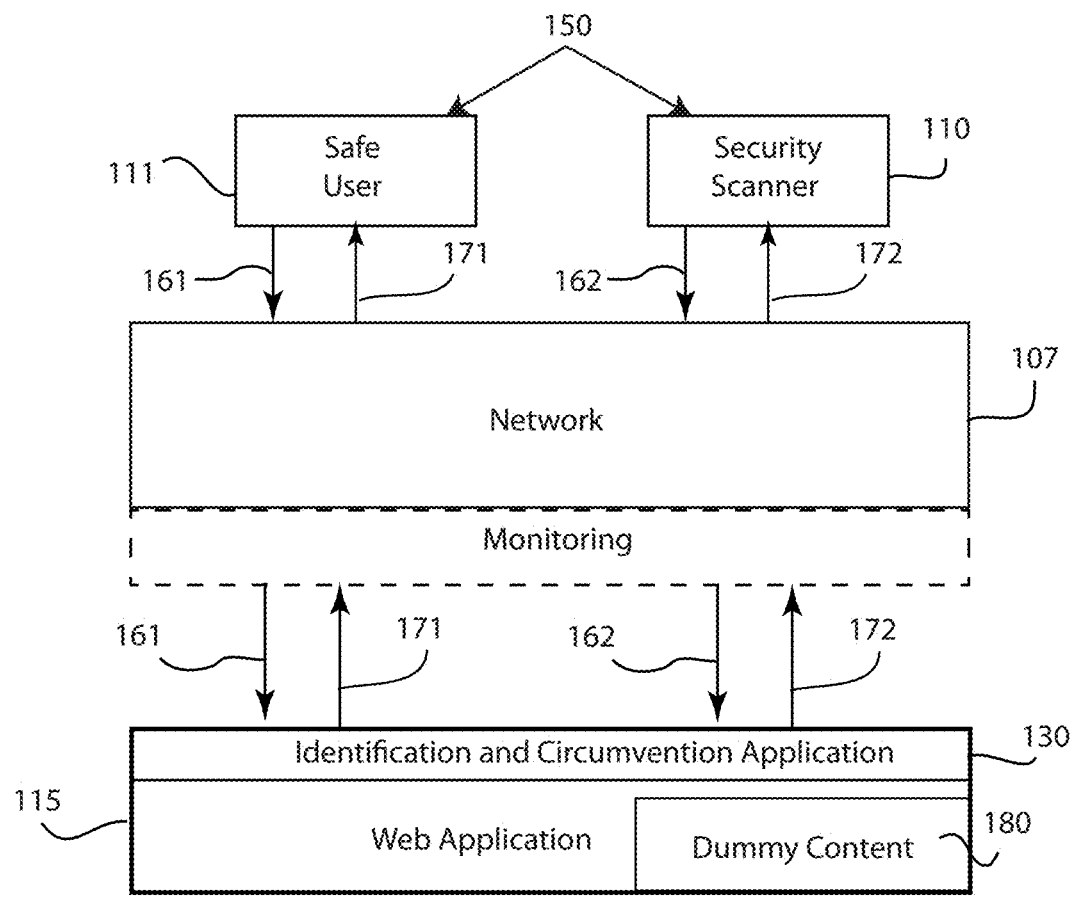
FIG. 5B depicts a block diagram of a security scanner identification and circumvention system used in connection with an information exchange between multiple users and a web application over a network, in accordance with further embodiments of the present invention.

For example, FIG. 5A depicts a block diagram of a security scanner identification and circumvention system used in connection with an information exchange between multiple users and a web application over a network, in accordance with further embodiments of the present invention. In the embodiment of FIG. 5A, the identification and circumvention application 130 is part of a firewall. FIG. 5B depicts a block diagram of a security scanner identification and circumvention system used in connection with an information exchange between multiple users and a web application over a network, in accordance with further embodiments of the present invention. As shown in FIG. 5B, the identification and circumvention application 130 may be located with the web application 115 in some embodiments.

When the identification and circumvention application 130 is located within the web application 115 itself, the web application traffic modelling module 133 may be included within the web application 115, and thus the security scanner traffic profile may be created/updated within the web application 115. Alternatively, the web application traffic modelling module 133 may be located separately and may provide the security scanner traffic profile to the identification and circumvention application 130 or to the web application traffic monitoring module 131. Still further, the identification and circumvention application 130 or the web application traffic monitoring module 131 may interact with the web application traffic modelling module 133 through an application programming interface (API) or may access the security scanner traffic profile in some other way. Still further, the identification and circumvention application 130 or to the web application traffic monitoring module 131 may be provided with rules, filters, or other analysis tools based on the security scanner traffic profile or other information from the web application traffic modelling module 133.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention).

The security scanner identification and circumvention system 100 improves security of web applications and networks. Further, the security scanner identification and circumvention system 100 provides for increased reliability and trustworthiness for vendors who provide security scanners and similar tools. Without the security scanner identification and circumvention system 100, web application developers and administrators do not have adequate defense means. Embodiments of the security scanner identification and circumvention system 100 provide a technical solution to the above-drawbacks by providing an identification and circumvention means. Further, the identification and circumvention are capable of adapting to new and/or updated security scanner threats due to the artificial intelligence and machine learning used in modeling traffic for the security scanner traffic profile. The technical solution(s) described herein is necessarily rooted in computer technology in order to overcome a problem specifically arising in the realm of web application security. For instance, instead of being required to rely on hopefully-satisfactory testing, web applications and networks will now have an active, adapting defense against nefarious and malicious parties who use security scanners.

Figure 6A:
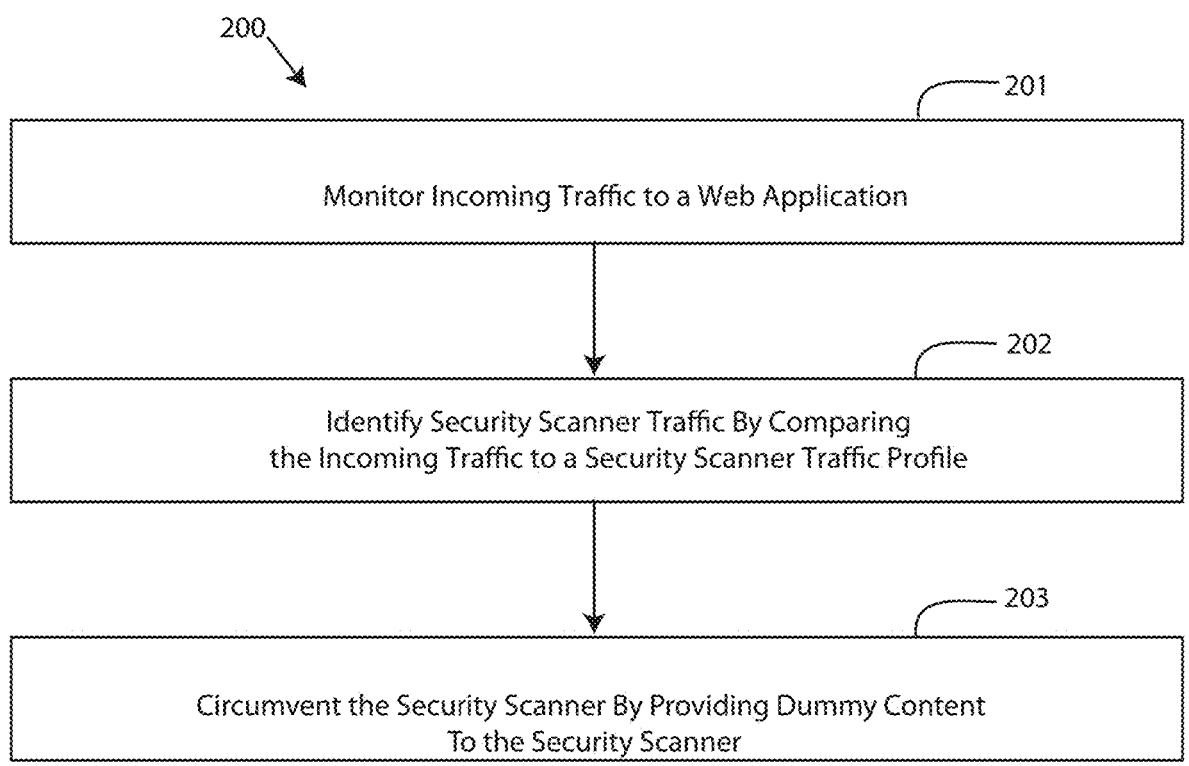
FIG. 6A depicts a flow chart of a method for identifying and circumventing security scanners, in accordance with embodiments of the present invention.

FIG. 6A depicts a flow chart of a method for identifying and circumventing security scanners, in accordance with embodiments of the present invention. As shown, a method 200 for identifying and circumventing security scanners may generally comprise monitoring incoming traffic to a web application, comparing the monitored incoming traffic to modelled security scan traffic to identify security scanners, and circumventing security scanners by providing dummy content.

Figure 10:
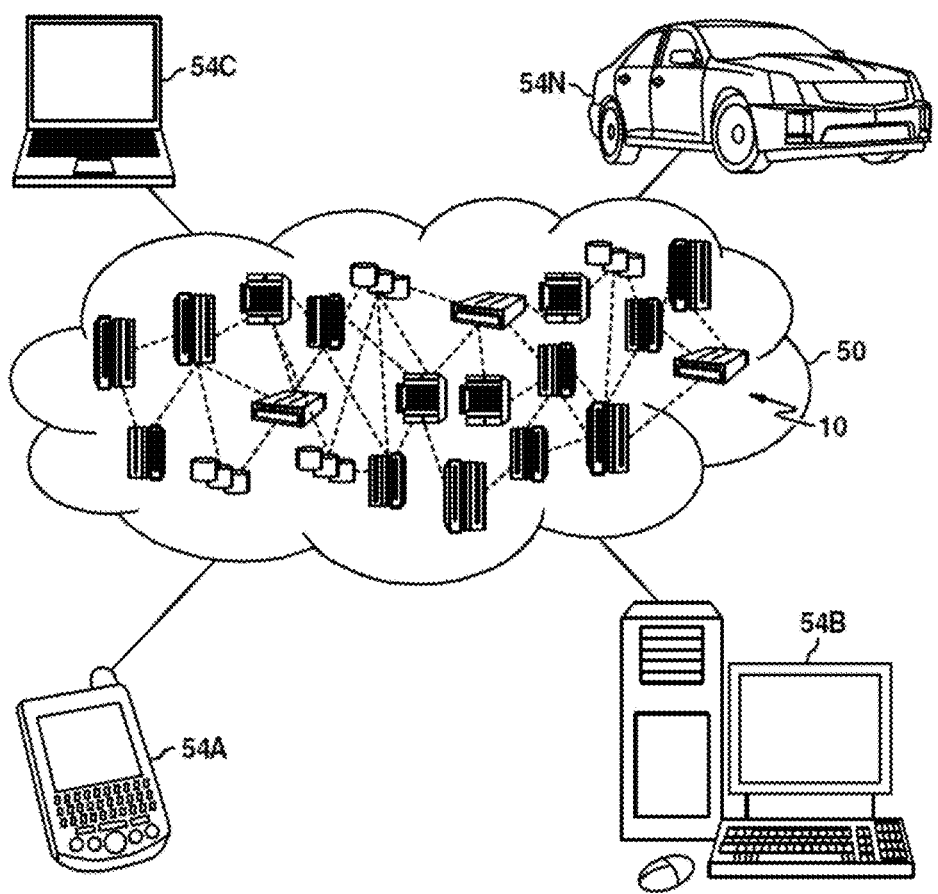
FIG. 10 depicts a cloud computing environment, in accordance with embodiments of the present invention.

One embodiment of a method 200 or algorithm that may be implemented for identifying and circumventing security scanners by monitoring incoming traffic to a web application, comparing the monitored incoming traffic to modelled security scan traffic to identify security scanners, and circumventing security scanners by providing dummy content with the security scanner identification and circumvention system 100 is described in FIGS. 1-5 using one or more computer systems as defined generically in FIG. 10 below, and more specifically by the specific embodiments of FIG. 1.

Embodiments of the method 200 for identifying and circumventing security scanners, in accordance with embodiments of the present invention, may begin at step 201 wherein incoming traffic to a web application, such as web application 115 described above, is monitored.

Step 202 identifies security scanner traffic in the incoming traffic to the web application. Security scanner traffic may be a portion of the incoming traffic. Security scanner traffic may originate at a security scanner such as security scanner 110 described above. The security scanner traffic may be identified by comparing the incoming traffic to a security scanner traffic profile.

Step 203 circumvents the security scanner. The security scanner may be circumvented by providing dummy content to the security scanner.

Figure 6B:
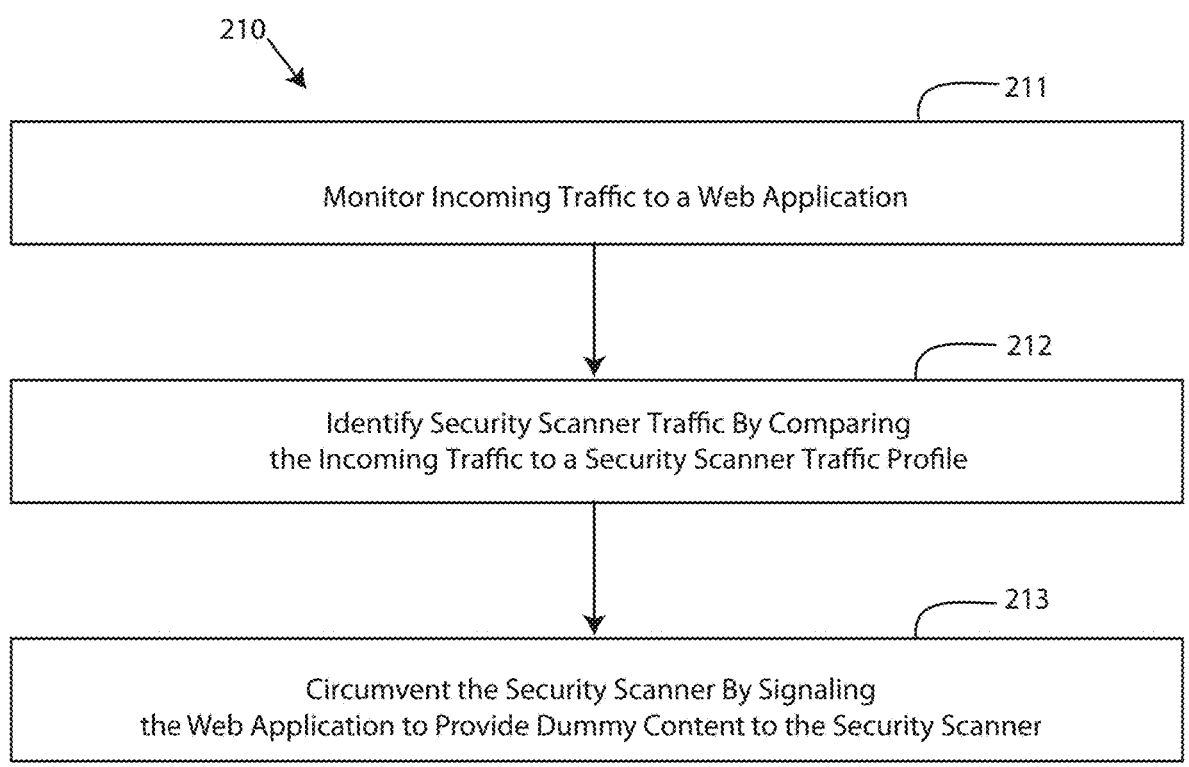
FIG. 6B depicts a flow chart of a method for identifying and circumventing security scanners, in accordance with further embodiments of the present invention.

FIG. 6B depicts a flow chart of a method for identifying and circumventing security scanners, in accordance with further embodiments of the present invention. As shown, a method 210 for identifying and circumventing security scanners may generally comprise monitoring incoming traffic to a web application, comparing the monitored incoming traffic to modelled security scan traffic to identify security scanners, and circumventing security scanners by providing dummy content.

One embodiment of a method 210 or algorithm that may be implemented for identifying and circumventing security scanners by monitoring incoming traffic to a web application, comparing the monitored incoming traffic to modelled security scan traffic to identify security scanners, and circumventing security scanners by providing dummy content with the security scanner identification and circumvention system 100 is described in FIGS. 1-5 using one or more computer systems as defined generically in FIG. 10 below, and more specifically by the specific embodiments of FIG. 1.

Embodiments of the method 210 for identifying and circumventing security scanners in accordance with embodiments of the present invention, may begin at step 211 wherein incoming traffic to a web application, such as web application 115 described above, is monitored.

Step 212 identifies security scanner traffic in the incoming traffic to the web application. Security scanner traffic may be a portion of the incoming traffic. Security scanner traffic may originate at a security scanner such as security scanner 110 described above. The security scanner traffic may be identified by comparing the incoming traffic to a security scanner traffic profile.

Step 213 circumvents the security scanner. The security scanner may be circumvented by signaling the web application to provide dummy content to the security scanner.

Figure 7:
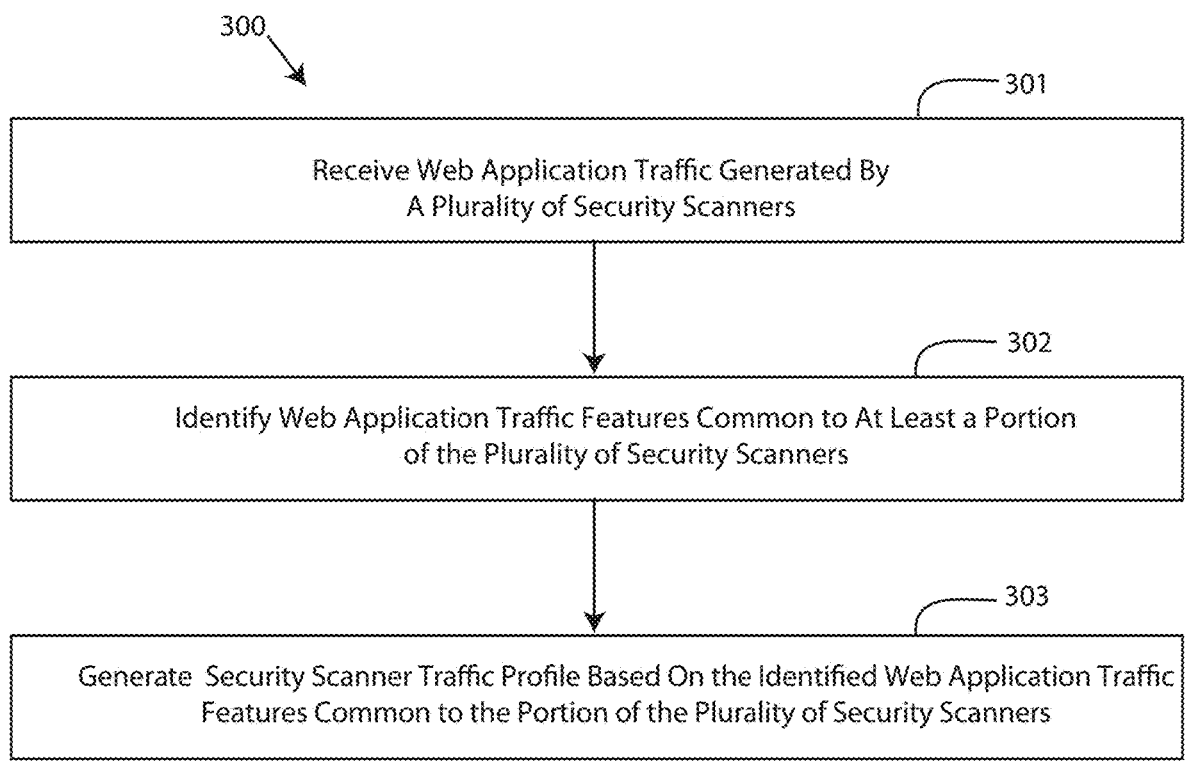
FIG. 7 depicts a flow chart of a method for generating a security scanner traffic profile, in accordance with embodiments of the present invention.

FIG. 7 depicts a flow chart of a method for generating a security scanner traffic profile, in accordance with embodiments of the present invention. As shown, a method 300 may generally comprise receiving web application traffic generated by a plurality of security scanners, identifying web application traffic features common to at least a portion of the plurality of security scanners, and generating a security scanner traffic profile based on the identified web application traffic features common to the portion of the plurality of security scanners.

One embodiment of a method 300 or algorithm for modelling web application traffic to generate a security scanner traffic profile is described in FIGS. 1-5 using one or more computer systems as defined generically in FIG. 10 below, and more specifically by the specific embodiments of FIG. 1.

Embodiments of the method 300 for modelling web application traffic to generate a security scanner traffic profile, may begin at step 301 wherein web application traffic generated by a plurality of security scanners is received.

Step 302 identifies web application traffic features common to at least a portion of the plurality of security scanners.

Step 303 generates a security scanner traffic profile based on the identified web application traffic features common to the portion of the plurality of security scanners.

Figure 8A:
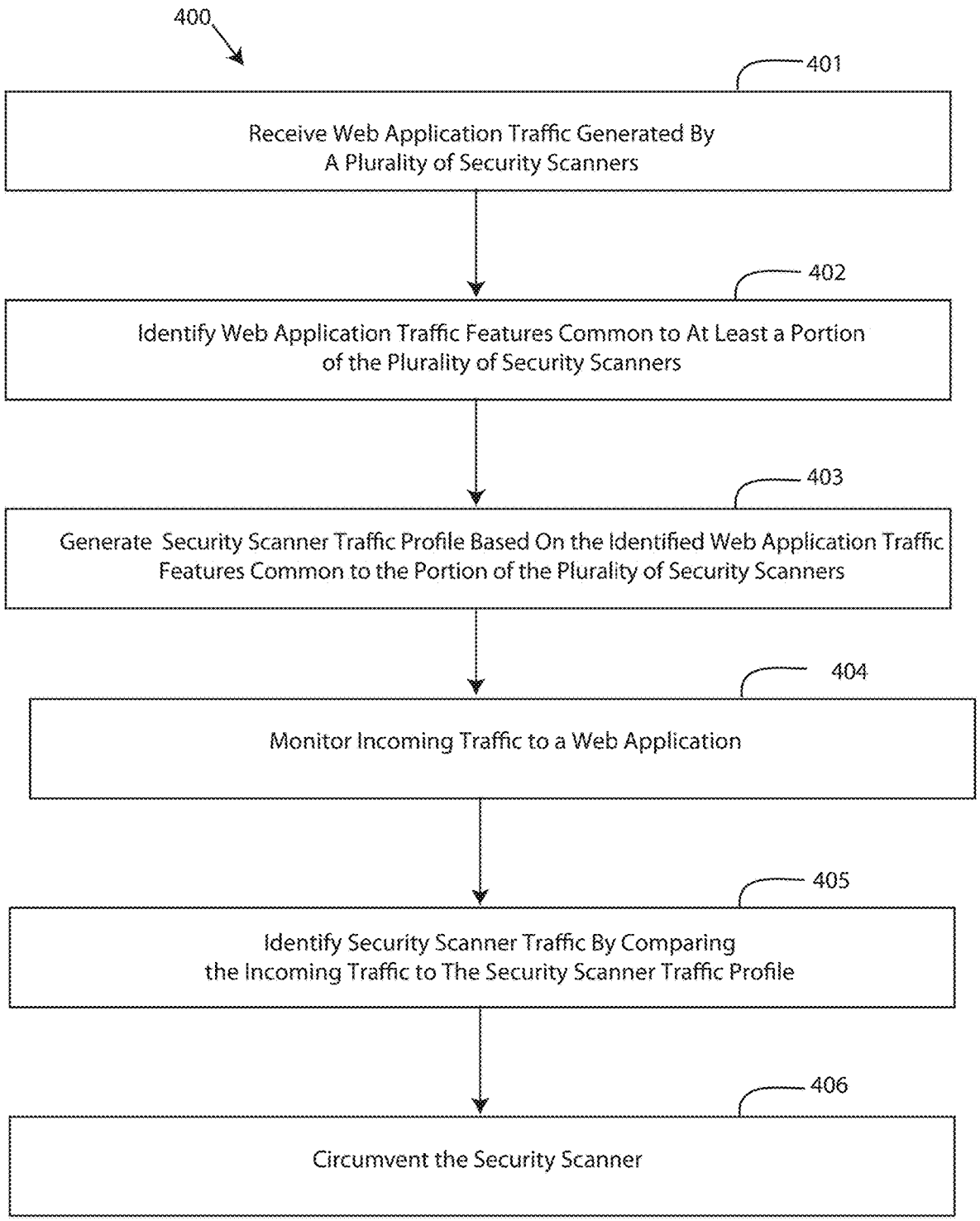
FIG. 8A depicts a flow chart of a method for identifying and circumventing security scanners, wherein the method includes steps for generating a security scanner traffic profile, in accordance with embodiments of the present invention.

FIG. 8A depicts a flow chart of a method for identifying and circumventing security scanners, wherein the method includes steps for generating a security scanner traffic profile, in accordance with embodiments of the present invention. As shown, a method 400 may generally comprise modelling web application traffic to generate a security scanner traffic profile, identifying a security scanner by monitoring web application traffic and comparing the monitored web application traffic to the security scanner traffic profile, and circumventing security scanners by providing dummy content.

One embodiment of a method 400 or algorithm that may be implemented for identifying and circumventing security scanners by monitoring incoming traffic to a web application, comparing the monitored incoming traffic to modelled security scan traffic to identify security scanners, and circumventing security scanners by providing dummy content with the security scanner identification and circumvention system 100 is described in FIGS. 1-5 using one or more computer systems as defined generically in FIG. 10 below, and more specifically by the specific embodiments of FIG. 1.

Embodiments of the method 400 may begin at step 401 wherein web application traffic generated by a plurality of security scanners is received.

Step 402 identifies web application traffic features common to at least a portion of the plurality of security scanners.

Step 403 generates a security scanner traffic profile based on the identified web application traffic features common to the portion of the plurality of security scanners.

Step 404 monitors incoming traffic to a web application, such as web application 115 described above.

Step 405 identifies security scanner traffic in the incoming traffic to the web application by comparing the incoming traffic to the security scanner traffic profile.

Step 406 circumvents the security scanner. The security scanner may be circumvented by providing dummy content to the security scanner or signaling the web application to provide dummy content to the security scanner.

Figure 8B:
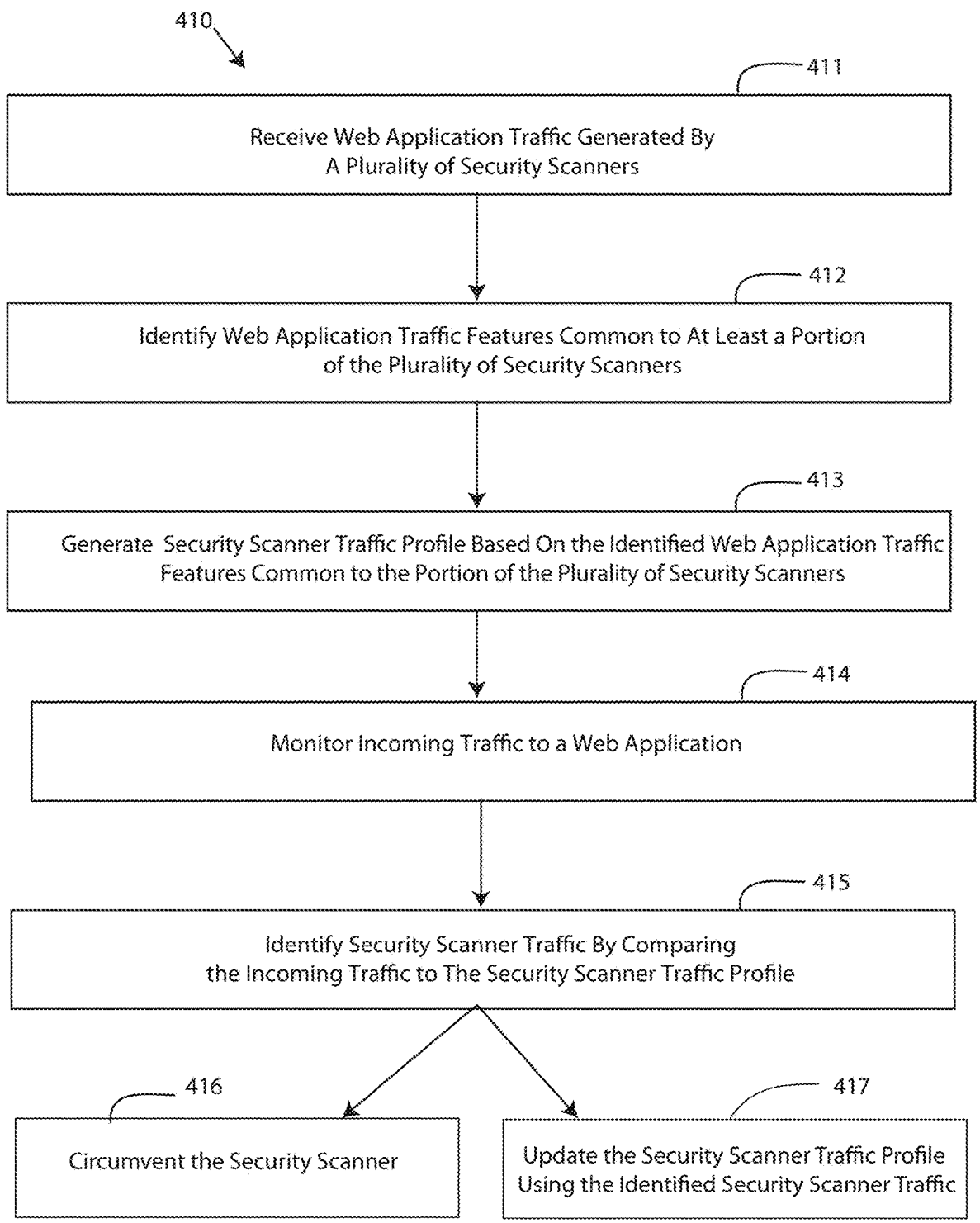
FIG. 8B depicts a flow chart of a method for identifying and circumventing security scanners, wherein the method includes steps for generating a security scanner traffic profile, in accordance with further embodiments of the present invention.

FIG. 8B depicts a flow chart of a method for identifying and circumventing security scanners, wherein the method includes steps for generating a security scanner traffic profile, in accordance with further embodiments of the present invention. As shown, a method 410 may generally comprise modelling web application traffic to generate a security scanner traffic profile, identifying a security scanner by monitoring web application traffic and comparing the monitored web application traffic to the security scanner traffic profile, and then circumventing security scanners by providing dummy content and updating the security scanner traffic profile.

One embodiment of a method 410 or algorithm that may be implemented for identifying and circumventing security scanners by monitoring incoming traffic to a web application, comparing the monitored incoming traffic to modelled security scan traffic to identify security scanners, and circumventing security scanners by providing dummy content with the security scanner identification and circumvention system 100 is described in FIGS. 1-5 using one or more computer systems as defined generically in FIG. 10 below, and more specifically by the specific embodiments of FIG. 1.

Embodiments of the method 410, may begin at step 411 wherein web application traffic generated by a plurality of security scanners is received.

Step 412 identifies web application traffic features common to at least a portion of the plurality of security scanners.

Step 413 generates a security scanner traffic profile based on the identified web application traffic features common to the portion of the plurality of security scanners.

Step 414 monitors incoming traffic to a web application, such as web application 115 described above.

Step 415 identifies security scanner traffic in the incoming traffic to the web application by comparing the incoming traffic to the security scanner traffic profile.

Step 416 circumvents the security scanner. The security scanner may be circumvented by providing dummy content to the security scanner or signaling the web application to provide dummy content to the security scanner.

Step 417 updates the security scanner traffic profile using the identified security scanner traffic. For example, the identified security scanner traffic may be used in additional modelling, may be used to determine if additional traffic features are shared by a plurality of security scanners etc.

Figure 9:
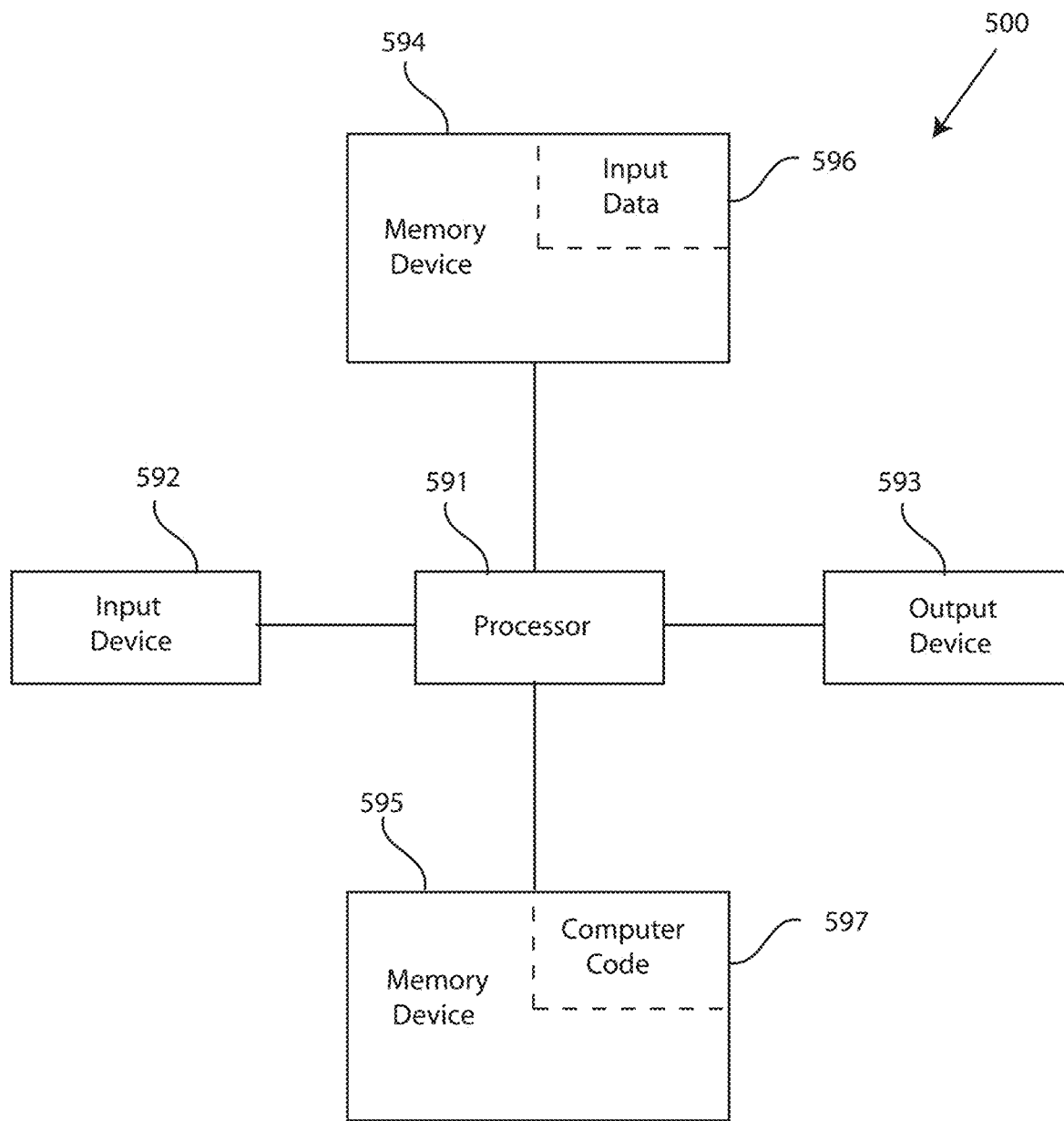
FIG. 9 depicts a block diagram of a computer system for the security scanner identification and circumvention system of FIGS. 1-5, capable of implementing the methods for identifying and circumventing security scanners of FIGS. 6-8, in accordance with embodiments of the present invention.

FIG. 9 depicts a block diagram of a computer system for the security scanner identification and circumvention system 100 of FIGS. 1-5, capable of implementing methods for identifying and circumventing a security scanner of FIGS. 6-8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for identifying and circumventing security scanners in the manner prescribed by the embodiments of FIGS. 6-8 using the security scanner identification and circumvention system 100 of FIGS. 1-5, wherein the instructions of the computer code 597 may be executed by processor 591 via memory device 595. The computer code 597 may include software or program instructions that may implement one or more algorithms for implementing the method for identifying and circumventing security scanners, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 10.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to security scanner identification and circumvention system systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to identify and circumvent security scanners. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for identifying and circumventing a security scanner. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for identifying and circumventing a security scanner.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 10 are intended to be illustrative only and that computing nodes 10 and cloud computing environment 50 can communicate with any type of computerized device over any type of network and/or network addressable connection (e.g., using a web browser).

Figure 11:
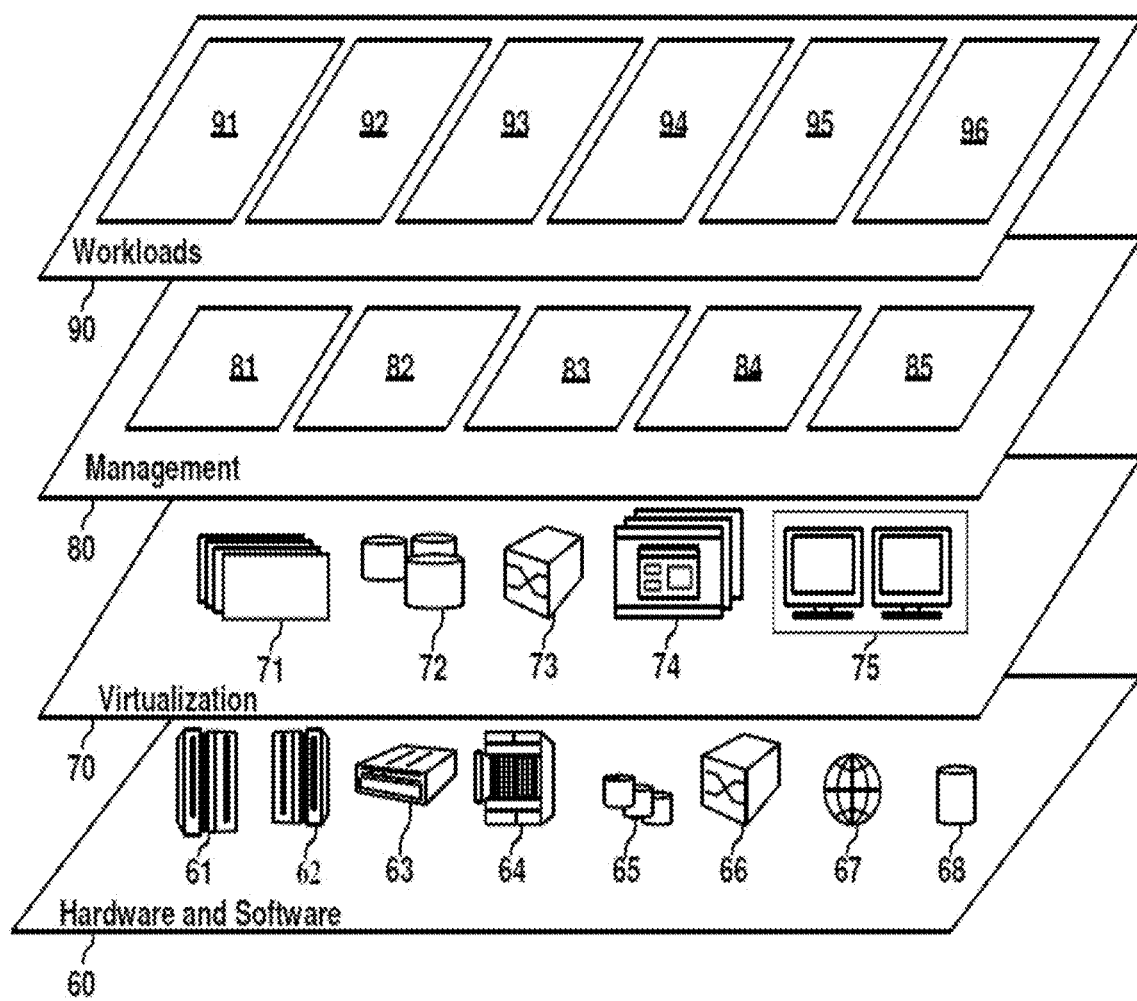
FIG. 11 depicts abstraction model layers, in accordance with embodiments of the present invention.

Referring now to FIG. 11, a set of functional abstraction layers provided by cloud computing environment 50 (see FIG. 10) are shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security scanner identification and circumvention 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for identifying and circumventing a security scanner, the method comprising:
   receiving, by a processor of a computing system, web application traffic generated by a plurality of security scanners;
   identifying, by the processor, web application traffic features common to at least a portion of the plurality of security scanners;
   generating, by the processor, a security scanner traffic profile based on the identified web application traffic features common to the portion of the plurality of security scanners;
   monitoring, by the processor of a computing system, incoming traffic to a web application;
   identifying, by the processor, a portion of the incoming traffic as security scanner traffic originating from the security scanner by comparing the incoming traffic to a security scanner traffic profile; and
   circumventing, by the processor, the security scanner by at least one of:
      providing, by the processor, dummy content to the security scanner; and
      signaling, by the processor, the web application to perform the step of providing dummy content to the security scanner;
   wherein the providing dummy content includes servicing a request from the security scanner with static content to cause the security scanner to mistakenly believe an attack or probe of the web application is unsuccessful.

2. The method of claim 1, wherein the security scanner traffic profile is created by modelling known security scanner traffic.

3. The method of claim 1, wherein the step of monitoring the incoming traffic comprises evaluating requests to the web application.

4. The method of claim 3, wherein the requests to the web application are HTTP requests.

5. The method of claim 1, wherein the step of monitoring, by the processor, the incoming traffic comprises at least one of real time monitoring and monitoring access logs.

6. The method of claim 1, wherein the static content is any response that does not provide the information requested by the security scanner request.

7. A computing system, comprising:
   a processor;
   a memory device coupled to the processor; and
   a computer readable storage device coupled to the processor, wherein the storage device contains program code executable by the processor via the memory device to implement a method for identifying and circumventing a security scanner, the method comprising:
      receiving, by the processor, web application traffic generated by a plurality of security scanners;
      identifying, by the processor, web application traffic features common to at least a portion of the plurality of security scanners;
      generating, by the processor, a security scanner traffic profile based on the identified web application traffic features common to the portion of the plurality of security scanners;
      monitoring, by the processor, incoming traffic to a web application;
      identifying, by the processor, a portion of the incoming traffic as security scanner traffic originating from the security scanner by comparing the incoming traffic to a security scanner traffic profile; and
      circumventing, by the processor, the security scanner by at least one of:
         providing, by the processor, dummy content to the security scanner; and
         signaling, by the processor, the web application to perform the step of providing dummy content to the security scanner;
      wherein the providing dummy content includes servicing a request from the security scanner with static content to cause the security scanner to mistakenly believe an attack or probe of the web application is unsuccessful.

8. The computer system of claim 7, wherein the security scanner traffic profile is created by modelling known security scanner traffic.

9. The computer system of claim 7, wherein the step of monitoring the incoming traffic comprises evaluating requests to the web application.

10. A computer program product, comprising a computer readable hardware storage device storing a computer readable program code, the computer readable program code comprising an algorithm that when executed by a computer processor of a computing system implements a method for identifying and circumventing a security scanner, the method comprising:
   receiving, by the processor, web application traffic generated by a plurality of security scanners;
   identifying, by the processor, web application traffic features common to at least a portion of the plurality of security scanners;

generating, by the processor, a security scanner traffic profile based on the identified web application traffic features common to the portion of the plurality of security scanners;

monitoring, by the processor, incoming traffic to a web application;

identifying, by the processor, a portion of the incoming traffic as security scanner traffic originating from the security scanner by comparing the incoming traffic to a security scanner traffic profile; and circumventing, by the processor, the security scanner by at least one of:
- providing, by the processor, dummy content to the security scanner; and
- signaling, by the processor, the web application to perform the step of providing dummy content to the security scanner;

wherein the providing dummy content includes servicing a request from the security scanner with static content to cause the security scanner to mistakenly believe an attack or probe of the web application is unsuccessful.

11. The computer program product of claim 10, wherein the security scanner traffic profile is created by modelling known security scanner traffic.

12. The computer program product of claim 10, wherein the step of monitoring the incoming traffic comprises evaluating requests to the web application.

* * * * *